US008712469B2

(12) United States Patent
Whinnett et al.

(10) Patent No.: US 8,712,469 B2
(45) Date of Patent: Apr. 29, 2014

(54) ACCESSING A BASE STATION

(75) Inventors: Nicholas William Whinnett, Marlborough (GB); Fiona Clare Angharad Somerville, Bristol (GB)

(73) Assignee: Mindspeed Technologies U.K., Limited, Bath (GB)

( * ) Notice: Subject to any disclaimer, the term of this patent is extended or adjusted under 35 U.S.C. 154(b) by 0 days.

(21) Appl. No.: 13/472,267

(22) Filed: May 15, 2012

(65) Prior Publication Data

US 2012/0295603 A1 Nov. 22, 2012

(30) Foreign Application Priority Data

May 16, 2011 (GB) .................................. 1108105.6

(51) Int. Cl.
*H04M 1/00* (2006.01)
(52) U.S. Cl.
USPC ........................................ 455/552.1; 455/418
(58) Field of Classification Search
USPC ............................................. 455/418, 552.1
See application file for complete search history.

(56) References Cited

U.S. PATENT DOCUMENTS

| | | | |
|---|---|---|---|
| 4,380,046 A | 4/1983 | Frosch et al. |
| 4,574,345 A | 3/1986 | Konesky |
| 4,589,066 A | 5/1986 | Lam et al. |
| 4,601,031 A | 7/1986 | Walker et al. |
| 4,603,404 A | 7/1986 | Yamauchi et al. |
| 4,622,632 A | 11/1986 | Tanimoto et al. |
| 4,698,746 A | 10/1987 | Goldstein |
| 4,720,780 A | 1/1988 | Dolecek |
| 4,736,291 A | 4/1988 | Jennings et al. |
| 4,814,970 A | 3/1989 | Barbagelata et al. |
| 4,825,359 A | 4/1989 | Ohkami et al. |
| 4,858,233 A | 8/1989 | Dyson et al. |
| 4,890,279 A | 12/1989 | Lubarsky |
| 4,914,653 A | 4/1990 | Bishop et al. |
| 4,937,741 A | 6/1990 | Harper et al. |
| 4,943,912 A | 7/1990 | Aoyama et al. |
| 4,967,326 A | 10/1990 | May |
| 4,974,146 A | 11/1990 | Works et al. |
| 4,974,190 A | 11/1990 | Curtis |
| 4,992,933 A | 2/1991 | Taylor |
| 5,036,453 A | 7/1991 | Renner et al. |
| 5,038,386 A | 8/1991 | Li |
| 5,065,308 A | 11/1991 | Evans |
| 5,109,329 A | 4/1992 | Strelioff |
| 5,152,000 A | 9/1992 | Hillis |
| 5,193,175 A | 3/1993 | Cutts et al. |
| 5,233,615 A | 8/1993 | Goetz |
| 5,239,641 A | 8/1993 | Horst |
| 5,241,491 A | 8/1993 | Carlstedt |
| 5,247,694 A | 9/1993 | Dahl |
| 5,253,308 A | 10/1993 | Johnson |
| 5,265,207 A | 11/1993 | Zak et al. |
| 5,280,584 A | 1/1994 | Caesar et al. |
| 5,384,697 A | 1/1995 | Pascucci |
| 5,386,495 A | 1/1995 | Wong et al. |
| 5,408,676 A | 4/1995 | Mori |
| 5,410,723 A | 4/1995 | Schmidt et al. |
| 5,410,727 A | 4/1995 | Jaffe et al. |
| 5,473,731 A | 12/1995 | Seligson |
| 5,555,548 A | 9/1996 | Iwai et al. |
| 5,557,751 A | 9/1996 | Banman et al. |
| 5,570,045 A | 10/1996 | Erdal et al. |
| 5,600,784 A | 2/1997 | Bissett et al. |
| 5,692,139 A | 11/1997 | Slavenburg |
| 5,719,445 A | 2/1998 | McClure |
| 5,734,921 A | 3/1998 | Dapp et al. |
| 5,752,067 A | 5/1998 | Wilkinson et al. |
| 5,761,514 A | 6/1998 | Aizikowitz et al. |
| 5,790,879 A | 8/1998 | Wu |
| 5,795,797 A | 8/1998 | Chester et al. |
| 5,796,937 A | 8/1998 | Kizuka |
| 5,802,561 A | 9/1998 | Fava et al. |
| 5,805,839 A | 9/1998 | Singhal |
| 5,826,033 A | 10/1998 | Hayashi et al. |
| 5,826,049 A | 10/1998 | Ogata et al. |
| 5,826,054 A | 10/1998 | Jacobs et al. |
| 5,845,060 A | 12/1998 | Vrba et al. |
| 5,860,008 A | 1/1999 | Bradley |
| 5,861,761 A | 1/1999 | Kean |
| 5,864,706 A | 1/1999 | Kurokawa et al. |

(Continued)

FOREIGN PATENT DOCUMENTS

| | | |
|---|---|---|
| CN | 101754351 | 6/2010 |
| CN | 101873688 | 10/2010 |

(Continued)

OTHER PUBLICATIONS

"Details on specification aspects for UL ICIC", Qualcomm Europe, May 5-May 9, 2008, 2 pages.
3GPP TS 36.331 v9.2.0 3RD Generation Partnership Project: Technical Specification Group Radio Access Network; Evolved Universal Terrestrial Radio Acces (E-UTRA); Radio Resource Control (RRC) Protocol specification (Release 9) Mar. 2010, pp. 1-248.
Alcatel-Lucent, et al., "Congested H(e)NB Hybrid Access Mode cell", 2009, 3GPP Draft; R3-091053-Congested H(e)Nb, $3^{RD}$ Generation Partnership Project (3GPP), Apr. 29, 2009, 4 pages.
Motorola, "Text proposal for TR 36.9xx: Reducing HeNB interference by dynamically changing HeNB access mode", 2009, 3GPP Draft: R4-094688, Apr. 29, 2009, 2 pages.
MIPS, MIPS32 Architecture for Programmers, 2001, MIPS Technologies, vol. 2, pp. 1-253.
Pechanek, et al. ManArray Processor Interconnection Network: An Introduction, Euro-Par'99, LNCS 1685, pp. 761-765, 1999.

(Continued)

*Primary Examiner* — Charles Shedrick
(74) *Attorney, Agent, or Firm* — Weide & Miller, Ltd.

(57) ABSTRACT

Method, base station and computer program product for controlling access to the base station, the base station being arranged to serve a zone, the zone comprising a first cell implementing an access mode as one of an open access mode, a hybrid access mode, and a closed access mode. Operating conditions of the zone served by the base station are determined and then the access mode of the first cell is controlled based on the determined operating conditions of the zone served by the base station.

28 Claims, 2 Drawing Sheets

(56) References Cited

U.S. PATENT DOCUMENTS

| | | |
|---|---|---|
| 5,923,615 A | 7/1999 | Leach et al. |
| 5,926,640 A | 7/1999 | Mason et al. |
| 5,946,484 A | 8/1999 | Brandes |
| 5,951,664 A | 9/1999 | Lambrecht et al. |
| 5,959,995 A | 9/1999 | Wicki et al. |
| 5,963,609 A | 10/1999 | Huang |
| 6,023,757 A | 2/2000 | Nishimoto et al. |
| 6,044,451 A | 3/2000 | Slavenburg |
| 6,052,752 A | 4/2000 | Kwon |
| 6,055,285 A | 4/2000 | Alston |
| 6,069,490 A | 5/2000 | Ochotta et al. |
| 6,101,599 A | 8/2000 | Wright et al. |
| 6,122,677 A | 9/2000 | Porterfield |
| 6,167,502 A | 12/2000 | Pechanek et al. |
| 6,173,386 B1 | 1/2001 | Key et al. |
| 6,175,665 B1 | 1/2001 | Sawada |
| 6,199,093 B1 | 3/2001 | Yokoya |
| 6,317,820 B1 | 11/2001 | Shiell et al. |
| 6,345,046 B1 | 2/2002 | Tanaka |
| 6,360,259 B1 | 3/2002 | Bradley |
| 6,381,293 B1 | 4/2002 | Lee et al. |
| 6,381,461 B1 | 4/2002 | Besson et al. |
| 6,393,026 B1 | 5/2002 | Irwin |
| 6,408,402 B1 | 6/2002 | Norman |
| 6,424,870 B1 | 7/2002 | Maeda et al. |
| 6,448,910 B1 | 9/2002 | Lu |
| 6,499,096 B1 | 12/2002 | Suzuki |
| 6,499,097 B2 | 12/2002 | Tremblay et al. |
| 6,567,417 B2 | 5/2003 | Kalkunte et al. |
| 6,615,339 B1 | 9/2003 | Ito et al. |
| 6,631,439 B2 | 10/2003 | Saulsbury et al. |
| 6,681,341 B1 | 1/2004 | Fredenburg et al. |
| 6,775,766 B2 | 8/2004 | Revilla et al. |
| 6,795,422 B2 | 9/2004 | Ohsuge |
| 6,829,296 B1 | 12/2004 | Troulis et al. |
| 6,892,293 B2 | 5/2005 | Sachs et al. |
| 6,928,500 B1 | 8/2005 | Ramanujan et al. |
| 6,952,181 B2 | 10/2005 | Karr et al. |
| 6,961,782 B1 | 11/2005 | Denneau et al. |
| 6,996,157 B2 | 2/2006 | Ohsuge |
| 7,103,008 B2 | 9/2006 | Greenblat et al. |
| 7,161,978 B2 | 1/2007 | Lu et al. |
| 7,237,055 B1 | 6/2007 | Rupp |
| 7,302,552 B2 | 11/2007 | Guffens et al. |
| 7,340,017 B1 | 3/2008 | Banerjee |
| 7,342,414 B2 | 3/2008 | DeHon |
| 7,383,422 B2 | 6/2008 | Kageyama et al. |
| 7,428,721 B2 | 9/2008 | Rohe et al. |
| 7,549,081 B2 | 6/2009 | Robbins et al. |
| 7,672,836 B2 | 3/2010 | Lee et al. |
| 7,712,067 B1 | 5/2010 | Fung et al. |
| 7,801,029 B2 | 9/2010 | Wrenn et al. |
| 7,804,719 B1 | 9/2010 | Chirania et al. |
| 8,032,142 B2 | 10/2011 | Carter et al. |
| 2002/0045433 A1 | 4/2002 | Vihriala |
| 2002/0069345 A1 | 6/2002 | Mohamed et al. |
| 2002/0174318 A1 | 11/2002 | Stuttard et al. |
| 2002/0198606 A1 | 12/2002 | Satou |
| 2003/0154358 A1 | 8/2003 | Seong |
| 2003/0235241 A1 | 12/2003 | Tamura |
| 2004/0078548 A1 | 4/2004 | Claydon et al. |
| 2004/0083409 A1 | 4/2004 | Rozenblit et al. |
| 2004/0139466 A1 | 7/2004 | Sharma et al. |
| 2004/0150422 A1 | 8/2004 | Wong et al. |
| 2004/0198386 A1 | 10/2004 | Dupray |
| 2005/0083840 A1 | 4/2005 | Wilson |
| 2005/0114565 A1 | 5/2005 | Gonzalez et al. |
| 2005/0124344 A1 | 6/2005 | Laroia et al. |
| 2005/0163248 A1 | 7/2005 | Berangi et al. |
| 2005/0250502 A1 | 11/2005 | Laroia et al. |
| 2005/0282500 A1 | 12/2005 | Wang et al. |
| 2006/0087323 A1 | 4/2006 | Furse et al. |
| 2006/0089154 A1 | 4/2006 | Laroia et al. |
| 2006/0251046 A1 | 11/2006 | Fujiwara |
| 2006/0268962 A1 | 11/2006 | Cairns et al. |
| 2007/0036251 A1 | 2/2007 | Jelonnek et al. |
| 2007/0127556 A1 | 6/2007 | Sato |
| 2007/0173255 A1 | 7/2007 | Tebbit et al. |
| 2007/0183427 A1 | 8/2007 | Nylander et al. |
| 2007/0220522 A1 | 9/2007 | Coene et al. |
| 2007/0220586 A1 | 9/2007 | Salazar |
| 2007/0248191 A1 | 10/2007 | Pettersson |
| 2007/0254620 A1 | 11/2007 | Lindqvist et al. |
| 2007/0263544 A1 | 11/2007 | Yamanaka et al. |
| 2007/0270151 A1 | 11/2007 | Claussen et al. |
| 2008/0146154 A1 | 6/2008 | Claussen et al. |
| 2008/0151832 A1 | 6/2008 | Iwasaki |
| 2009/0003263 A1 | 1/2009 | Foster et al. |
| 2009/0042593 A1 | 2/2009 | Yavuz et al. |
| 2009/0046665 A1 | 2/2009 | Robson et al. |
| 2009/0070694 A1* | 3/2009 | Ore et al. ................ 715/764 |
| 2009/0080550 A1 | 3/2009 | Kushioka |
| 2009/0092122 A1 | 4/2009 | Czaja et al. |
| 2009/0097452 A1 | 4/2009 | Gogic |
| 2009/0098871 A1 | 4/2009 | Gogic |
| 2009/0111503 A1 | 4/2009 | Pedersen et al. |
| 2009/0150420 A1 | 6/2009 | Towner |
| 2009/0163216 A1 | 6/2009 | Hoang et al. |
| 2009/0168726 A1* | 7/2009 | Thalanany et al. ........... 370/332 |
| 2009/0168907 A1 | 7/2009 | Mohanty et al. |
| 2009/0196253 A1 | 8/2009 | Semper |
| 2009/0215390 A1 | 8/2009 | Ku et al. |
| 2009/0252200 A1 | 10/2009 | Dohler et al. |
| 2009/0264077 A1 | 10/2009 | Damnjanovic |
| 2009/0296635 A1 | 12/2009 | Hui et al. |
| 2009/0325634 A1* | 12/2009 | Bienas et al. ............. 455/552.1 |
| 2010/0035556 A1 | 2/2010 | Cai et al. |
| 2010/0046455 A1 | 2/2010 | Wentink et al. |
| 2010/0054237 A1 | 3/2010 | Han et al. |
| 2010/0087148 A1 | 4/2010 | Srinivasan et al. |
| 2010/0105345 A1 | 4/2010 | Thampi et al. |
| 2010/0111070 A1 | 5/2010 | Hsu |
| 2010/0157906 A1 | 6/2010 | Yang et al. |
| 2010/0195525 A1 | 8/2010 | Eerolainen |
| 2010/0215032 A1 | 8/2010 | Jalloul et al. |
| 2010/0216403 A1 | 8/2010 | Harrang |
| 2010/0216485 A1 | 8/2010 | Hoole |
| 2010/0222068 A1 | 9/2010 | Gaal et al. |
| 2010/0234061 A1 | 9/2010 | Khandekar et al. |
| 2010/0248646 A1 | 9/2010 | Yamazaki et al. |
| 2010/0273481 A1 | 10/2010 | Meshkati et al. |
| 2010/0279689 A1 | 11/2010 | Tinnakornsrisuphap et al. |
| 2011/0002426 A1 | 1/2011 | Muirhead |
| 2011/0122834 A1 | 5/2011 | Walker et al. |
| 2011/0130143 A1 | 6/2011 | Mori et al. |
| 2011/0170494 A1 | 7/2011 | Kim et al. |
| 2013/0021933 A1* | 1/2013 | Kovvali et al. ................. 370/252 |
| 2013/0102313 A1* | 4/2013 | Tinnakornsrisuphap et al. ............. 455/436 |

FOREIGN PATENT DOCUMENTS

| | | |
|---|---|---|
| EP | 0 180 212 A3 | 5/1986 |
| EP | 492174 A3 | 7/1992 |
| EP | 0 877 533 A3 | 11/1998 |
| EP | 0 973 099 | 1/2000 |
| EP | 0 977 355 | 2/2000 |
| EP | 1054523 | 11/2000 |
| EP | 1 134 908 | 9/2001 |
| EP | 1418776 | 5/2004 |
| EP | 1 946 506 | 7/2008 |
| EP | 1876854 | 9/2008 |
| EP | 2 071 738 | 6/2009 |
| EP | 2 326 118 | 5/2011 |
| GB | 2 304 495 | 3/1997 |
| GB | 2 370 380 | 6/2002 |
| GB | 2398651 | 8/2004 |
| GB | 2 414 896 | 12/2005 |
| GB | 2391083 | 3/2006 |
| GB | 2 447 439 | 9/2008 |
| GB | 2463074 | 3/2010 |
| JP | 61123968 | 6/1986 |
| JP | A-8-297652 | 11/1996 |
| JP | 11272645 | 10/1999 |

(56) References Cited

FOREIGN PATENT DOCUMENTS

| | | |
|---|---|---|
| JP | 2001-034471 | 2/2001 |
| JP | 2004-525439 | 8/2004 |
| JP | 2006-500673 | 1/2006 |
| WO | 90/04235 | 4/1990 |
| WO | 91/11770 | 8/1991 |
| WO | 97/026593 | 7/1997 |
| WO | 98/50854 | 11/1998 |
| WO | 01/02960 | 1/2001 |
| WO | 02/50624 | 6/2002 |
| WO | 02/50700 | 6/2002 |
| WO | 03/001697 | 1/2003 |
| WO | 2004/029796 A3 | 4/2004 |
| WO | 2004/034251 | 4/2004 |
| WO | 2004/102989 | 11/2004 |
| WO | 2005/048491 | 5/2005 |
| WO | 2006/059172 | 6/2006 |
| WO | 2007/021139 | 2/2007 |
| WO | 2007/054127 | 5/2007 |
| WO | 2007/056733 | 5/2007 |
| WO | 2007/126351 | 11/2007 |
| WO | 2008/030934 | 3/2008 |
| WO | 2008/090154 | 7/2008 |
| WO | 2008/099340 | 8/2008 |
| WO | 2008/155732 | 12/2008 |
| WO | 2009/054205 | 4/2009 |
| WO | 2010/072127 | 7/2010 |
| WO | 2010/126155 | 11/2010 |

OTHER PUBLICATIONS

Waddington, T., Decompilation of "hello world" on Pentium and SPARC, 4 pages, [retrieved on Aug. 3, 2012]. Retrieved from the Internet :<URL: http://web.archive.org/web/20050311141936/http://boomerang.sourceforge.net/helloworld.html>.

Balakrishnan, et al., CodeSurfer/x86—A Platform for Analyzing x86 Executables, Springer-Verlag Berlin Heidelber, 2005, [retrieved on Dec. 30, 2011], retrieved from the internet:<URL:http://www.springerlink.com/content/uneu2a95u9nvb20v/>.

Miecznikowski, J., et al., "Decompiling Java Using Stage Encapsulation", Proceedings of the Eighth Working Conference on Reverse Engineering, Oct. 2-5, 2001.

Panesar, G. et al., "Deterministic Parallel Processing", Proceedings of the 1st Microgrid Workshop, Jul. 2005.

Towner, D. et al., "Debugging and Verification of Parallel Systems—the picoChip way", 2004.

picoChip, "PC7203 Development Platform Preliminary Product Brief", Jul. 2007.

Ennals, R. et al., "Task Partitioning for Multi-core Network Processors", 2005.

Rabideau, Daniel J., et al., "Simulated Annealing for Mapping DSP Algorithms on to Multiprocessors," Signals, Systems and Computers, 1993 Conference Record of the Twenty-Seventh Asilomar Conference, Nov. 1-3, 1993, IEEE, pp. 668-672.

Nanda, Ashwini K., et al., "Mapping Applications onto a Cache Coherent Multiprocessor," Conference on High Performance Networking and Computing, Proceedings of the 1992 ACM/IEEE Conference on Supercomputing, 1992, IEEE, pp. 368-377.

Lin, Lian-Yu, et al., Communication-driven Task Binding for Multiprocessor with Latency Insensitive Network-on-Chip, Design Automation Conference, 2005 Proceedings of th ASP-DAC, Jan. 18/21, 2005, IEEE, pp. 39-44.

Holger Claussen, Bell Laboratories, Alcatel-Lucent; "Performance of Macro and Co-Channel Femtocells in a Hierarchical Cell Structure"; The 18th Annual IEEE Internation Symposium on Personal, Indoor and Mobile Radio Communications (PIMRC'07); Sep. 1, 2007; pp. 1-5, XP031168593, ISBN: 978-1-4244-1143-6; Swindon, United Kingdom.

Shiroshita, T., et al.: "Reliable data distribution middleware for large-scale massive data replication" Parallel and Distributed Information Systems, 1993, Fourth International Conference on Miami Beach, FL, USA Dec. 18-20, 1996, Los Alamitos, CA, USA IEEE Comput. Soc, US, Dec. 18, 1996, pp. 196-205m XP010213188 ISBN: 0-8186-7475-X.

Levine B. N. et al.: "A comparison of known classes of reliable multicast protocols" Netowrk Protocols, 1996 International Conference on Columbus, OH, USA Oct. 29-Nov. 1, 1996, Los Alamitos, CA, USA IEEE Comput. Soc. US Oct. 29, 1996, pp. 112-121, XP010204425 ISBN: 0-8186-7453-9.

Ishijima, et al., A Semi-Synchronous Circuit Design Method by Clock Tree Modification IEEE Trans. Fundamentals, vol. E85-A, No. 12 Dec. 2002.

Greenstreet, et al., Implementing a STARI Chip, IEEE 1995.

Hierarchical multiprocessor organizations; J. Archer Harris; David R. Smith; International Symposium on computer Architecture; Proceedings of the 4th annual symposium on Computer architecture pp. 41-48 Year of Publication 1977.

"Hierarchical Interconnection Networks for Multicomputer systems" Sivarama P. Dandamudi, et al. IEEE Transactions on Computers archive vol. 39, Issue 6 (Jun. 1990) pp. 786-797 Year of Publication: 1990.

A Cluster Structure as an Interconnection Network for Large Multimicrocomputer Systems Wu, S.B. Liu, M.T. This paper appears in: Transactions on Computers Publication Date: Apr. 1981 vol. C-30, Issue: 4 on pp. 254-264.

Performance Analysis of Multilevel Bus Networks for Hierarchichal Multiprocessors S.M. Mahmud IEEE Transactions on Computers archive vol. 43, Issue 7 (Jul. 1994) pp. 789-805 Year of Publication: 1994.

Performance Analysis of a Generalized Class of M-Level Hierarchical Multiprocessor Systems I.O. Mahgoub A.K. Elmagarmid Mar. 1992 (vol. 3, No. 2) pp. 129-138.

Kober, Rudolf, "The Multiprocessor System SMS 201—Combining 128 Microprocessors to a Powerful Computer," Sep. 1977, Compcon '77, pp. 225-230.

Knight, Thomas and Wu, Henry, "A Method for Skew-free Distribution of Digital Signals using Matched Variable Delay Lines," VLSI Circuits, 1993. Digest of Technical Papers. 1993 Symposium on, May 1993, pp. 19-21.

Popli, S.P., et al., "A Reconfigurable VLSI Array for Reliability and Yield Enhancement," Proceedings of the International Conference on Systolic Arrays, 1988, pp. 631-642.

John, L.K., et al., "A Dynamically Reconfigurable Interconnect for Array Processors," IEE Transactions on Very Large Scale Integration (lvsi) Systems, vol. 6, No. 1, Mar. 1998, pp. 150-157.

Schmidt, U., et al., "Datawave: A Single-Chip Multiprocessor for Video Applications," IEEE Micro, vol. 11, No. 3, Jun. 1991, pp. 22-25, 88-94.

Chean, M., et al., "A Taxonomy of Reconfiguration Techniques for Fault-Tolerant Processor Arrays," Computer, IEEE Computer Society, vol. 23, No. 1, Jan. 1990, pp. 55-69.

Kamiura, N., et al., "A Repairable and Diagnosable Cellular Array on Multiple-Valued Logic," Proceedings of the 23rd International Symposium on Multiple-Valued Logic, 1993, pp. 92-97.

LaForge, 1., "Externally Fault Tolerant Arrays," Proceedings: International Conference on Wafer Scale Integration, 1989, pp. 365-378.

Reiner Hartenstein, et al., On Reconfigurable Co-Processing Units, Proceedings of Reconfigurable Architectures Workshop (RAW98), Mar. 30, 1998.

Schmidt, U., et al., "Data-Driven Array Processor for Video Signal Processing", IEEE—1990 (USA).

Muhammad Ali Mazidi, "The80×86 IBM PC and Compatible Computers", 2003, Prentice Hall, 4th edition, pp. 513-515.

Shigei, N., et al., "On Efficient Spare Arrangements and an Algorithm with Relocating Spares for Reconfiguring Processor Arrays," IEICE Transactions on Fundamentals of Electronics, communications and Computer Sciences, vol. E80-A, No. 6, Jun. 1997, pp. 988-995.

"Interference Management in Femto Cell Deployment", Mingxi Fan, Mehmet Yavuz, Sanjiv Nanda, Yeliz Tokgoz, Farhad Meshkati, Raul Dangui, Qualcomm Incorporated, Qualcomm 3GPP2 Femto Workshop, Boston, MA, Oct. 15, 2007.

\* cited by examiner

FIG. 1

PRIOR ART

FIG. 2

PRIOR ART

ACCESSING A BASE STATION

PRIORITY CLAIM

This application claims priority to and the benefit of Great Britain Application No. 1108105.6 filed May 16, 2011.

FIELD OF THE INVENTION

The present invention relates to accessing a base station and in particular to controlling access to a cell served by a base station.

RELATED ART

As will be familiar to a person skilled in the art, a base station is the unit which provides a user equipment such as a mobile phone or computer with access to a wireless cellular network such as a network operating according to both 3G and 4G standards, the base station being the first stage up from the user equipment in the cellular hierarchy, i.e. the unit with which the user equipment immediately communicates via a wireless connection (without an intermediary station). According to 3GPP terminology, a base station is sometimes referred to as a "node B", but the more generic term "base station" will be maintained herein for convenience.

A femtocell is a type of cellular base station designed to operate over a relatively short range compared to a conventional base station. Short-range dedicated base stations such as femtocells have become more viable in recent years due to reduction in the cost and size of the electronics required to implement a cellular base station. The idea is to provide a dedicated base station to cover a relatively small geographical area which is expected to experience a high density of users and/or regular usage. For example femtocells are typically intended to be deployed in a small office, shop, café or even the home. Other types of short range base stations include picocells or microcells, typically covering an intermediately sized area; although the scope of femtocells is increasing as they are encroaching on what have been traditionally called picocells and microcells, supporting large offices, shopping malls and outdoor deployments. The scope of femtocells is increasing due to increased functionality over picocells and microcells. In some wireless standards, femtocells combine the functionality of several wireless network elements, for example in UMTS a femtocell combines the functionality of a base station and radio network controller (RNC). Also, it is typical for a femtocell to be installed by the end user, not the network operator, and extra functionality is required to support this, such as the ability to locate (sniff) neighboring base stations. This is in contrast to picocells to and microcells that are installed by a network operator and only provide base station functionality.

A feature of femtocells which may be different from other types of base-stations is their support for different types of access modes: open, closed and hybrid. The access mode defines which users are allowed to access the femtocell. If the femtocell implements an open access mode then the femtocell is available to all UEs which attempt to access the femtocell. If the femtocell implements a closed access mode then the femtocell is only available to UEs of users who are members of a particular closed subscriber group (CSG) associated with the closed access mode. If the femtocell implements a hybrid access mode then the femtocell is available to all UEs but a preferential service is given to those UEs of users who are members of the particular CSG. Femtocells are configured into one of these access modes.

SUMMARY

The inventors have realized that the access mode of a cell served by a femtocell, or other base station, may be controlled in order to improve the performance of the femtocell. In particular, the access mode of a cell served by a base station may be dynamically controlled (e.g. in real-time) based on the current operating conditions in the cell, or cells, served by the base station. By controlling the access mode of a cell, the users which are allowed to access the cell can be controlled.

According to a first aspect of the invention there is provided a method of to controlling access to a base station, the base station being arranged to serve a zone, said zone comprising a first cell implementing an access mode as one of: (i) an open access mode, (ii) a hybrid access mode, and (iii) a closed access mode, the method comprising: determining operating conditions of the zone served by the base station; and controlling the access mode of the first cell based on the determined operating conditions of the zone served by the base station.

Advantageously, the method can allow the access mode of the first cell to be configured based on the current operating conditions of the zone of the base station. By configuring the access mode of the first cell in accordance with the current operating conditions, the performance of the base station may be improved. The performance improvement may relate to the throughput and/or quality of service (QOS) achieved by a user equipment (UE) or by multiple UEs accessing the base station, or by UEs accessing neighboring base stations. The zone may represent one or more cells which are served by the base station.

In one embodiment the base station is a multi-mode base station, the zone further comprising a second cell implementing an access mode as one of: (i) an open access mode, (ii) a hybrid access mode, and (iii) a closed access mode. For example, the multi-mode base station may be a dual-mode femtocell, which is a base-station operating as two cells. The two cells could be operating with different radio access technologies (RAT), or the same RATs, but in different frequency sub-bands. In a dual-cell femtocell a joint radio resource management (RRM) entity may be capable of controlling the access mode configuration of each cell to thereby improve the performance of both cells. The RRM entity can take into consideration the operating conditions of both of the cells when controlling the access modes of the cells. In this way the RRM entity provides global control of the access modes of the cells, rather than considering each cell separately. Global control of the cells, such as this, may improve the overall performance of the dual-mode femtocell.

Where the base station is a multi-mode base station the method may further comprise controlling the access mode of the second cell based on the determined operating conditions of the zone served by the base station. The first and second cells to may operate using different radio access technologies or operate in different frequency sub bands. The access mode of the first cell may be controlled based on the access mode of the second cell. In this way the access modes of the first and second cells may be controlled in dependence upon each other to provide a global control of the access modes of the cells of a multi-mode base station.

The step of controlling the access mode of the first cell may comprise dynamically adjusting the access mode of the first cell, e.g. based on the current operating conditions of the zone served by the base station.

The step of determining operating conditions of the zone may comprise monitoring activity in the zone. In this case, the step of controlling the access mode of the first cell may comprise changing the access mode of the first cell from the closed access mode to the hybrid access mode or the open access mode if the monitored activity in the zone indicates that the level of activity of a user group associated with the closed access mode of the first cell is below a threshold activity level. Furthermore, in this case, the step of controlling the access mode of the first cell may comprise changing the access mode of the first cell to the closed access mode from the hybrid access mode or the open access mode if the monitored activity in the zone indicates that the level of activity of a user group associated with the closed access mode of the first cell is above a threshold activity level.

In some embodiments the first cell implements the closed access mode and the step of controlling the access mode of the first cell comprises dynamically adjusting the closed access mode to thereby dynamically adjust a set of users which are associated with the closed access mode and are thereby allowed to access the first cell.

The step of determining operating conditions of the zone may comprise monitoring loading in the zone. Furthermore, the step of determining operating conditions of the zone may comprise monitoring loading in a cell of a neighboring base station, said cell of the neighboring base station operating in the same frequency band as at least part of the zone served by the base station. The step of controlling the access mode of the first cell may comprise changing the access mode of the first cell to the open access mode or the hybrid access mode if the monitored loading in the cell of the neighboring base station is above a threshold load.

The method may further comprise monitoring a power level in a cell of a neighboring base station, said cell of the neighboring base station operating in the same frequency band as the first cell, wherein if the monitored power level is below a threshold power level then said controlling the access mode of the first cell may comprise setting the access mode of the first cell to the open access mode or the hybrid access mode. If the monitored power level is above the threshold power level then said controlling the access mode of the first cell may comprise setting the access mode of the first cell to the closed access mode.

According to a second aspect of the invention there is provided a base station arranged to serve a zone, said zone comprising a first cell implementing an access mode as one of: (i) an open access mode, (ii) a hybrid access mode, and (iii) a closed access mode, and the base station comprising a radio resource manager for controlling access to the base station, the radio resource manager being configured to perform operations in accordance with any of the methods described herein. The base station may be a dual-mode femtocell.

According to a third aspect of the invention there is provided a computer program product for controlling access to a base station, the base station being arranged to serve a zone, said zone comprising a first cell implementing an access mode as one of: (i) an open access mode, (ii) a hybrid access mode, and (iii) a closed access mode, and the computer program product being embodied on a non-transient computer-readable medium and configured so as when executed on a processor of the base station to perform the operations of any of the methods described herein.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views. For a better understanding of the present invention and to show how the same may be put into effect, reference will now be made, by way of example, to the following drawings in which.

DETAILED DESCRIPTION

Preferred embodiments of the invention will now be described by way of example only. The preferred embodiments described below are based on improvements which could be made with a joint Radio Resource Management (RRM) control of the access modes applied to a dual-mode femtocell. In other embodiments other base stations may be implemented.

Figure 1:
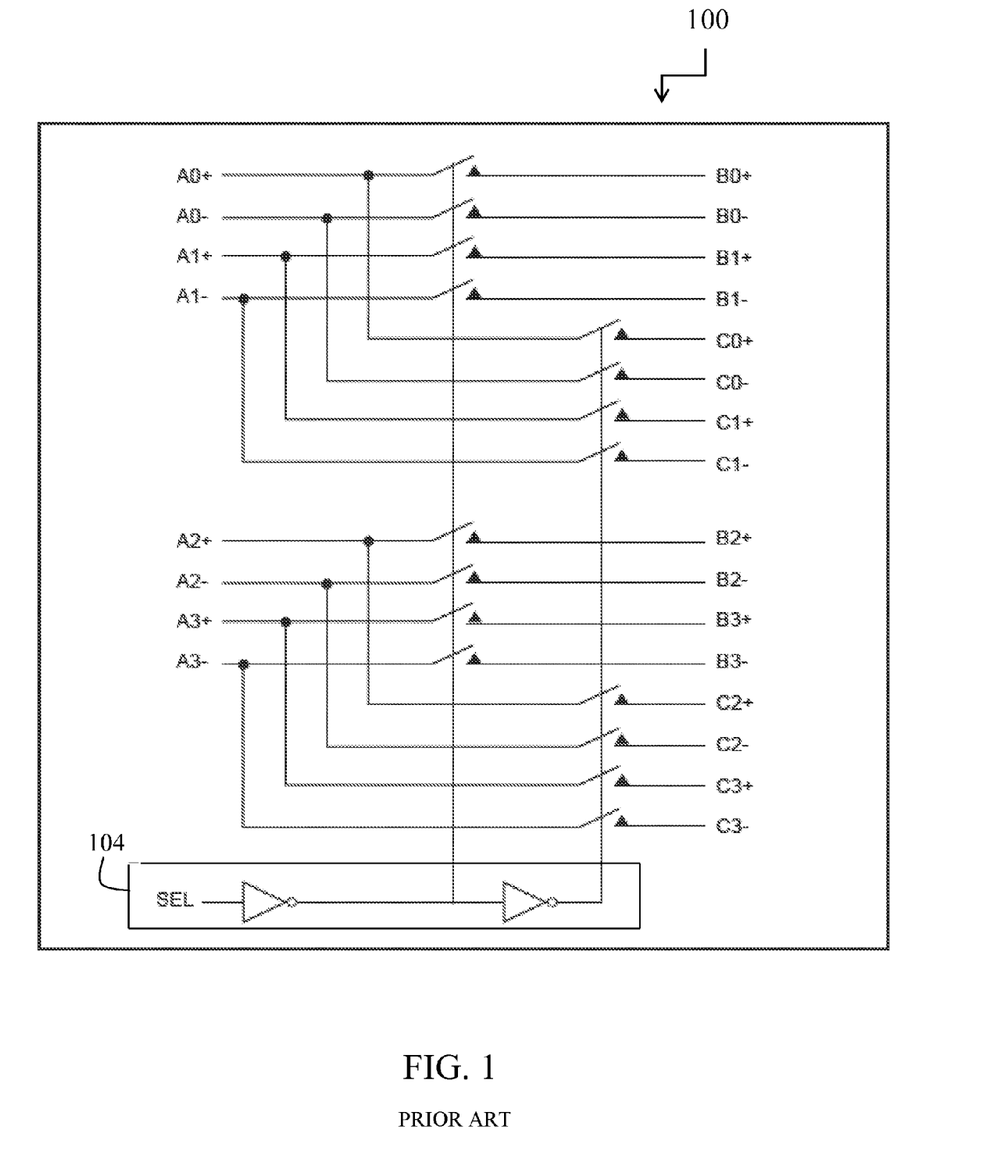
FIG. 1 is a schematic illustration of a part of a wireless cellular to communication network.

FIG. 1 is a schematic diagram showing a part of a wireless cellular communication network such as a 3G network. The network comprises four user equipments (UEs) 2A1, 2A2, 2B1 and 2B2 in the form of mobile terminals, such as smart phones or other mobile phones, tablets, or laptop or desktop computers equipped with wireless data cards. The network further comprises a base station in the form of a femtocell 4, and one or more further base stations 6. Each base station (4 and 6) provides network coverage in a "zone" in the form of at least one respective cell 4a, 4b, 6a.

Furthermore, the femtocell 4 is configured as a dual-mode femtocell. A dual-mode femtocell is a base station serving two logical cells 4a and 4b. These cells 4a, 4b are configured to operate according to different radio access technologies (RATs), i.e. different telecommunication standards, and/or in different frequency sub-bands. For example one of the dual cells may be arranged to operate according to a 3G standard such as a Universal Mobile Telecommunications System (UMTS) standard and the other of the dual cells may be arranged to operate according to a 4G standard such as a Long Term Evolution (LTE) standard. The reach of the cells 4a, 4b does not necessarily extend across exactly the same geographical area. Range is highly dependent on RAT and frequency, e.g. cell 4a could be twice the size of cell 4b. The arrangement shown in FIG. 1 is only schematic. On a point of terminology, note that "base station" or "femtocell" refers to the unit, while "cell" refers to the logical combination of geographical coverage area and access technology or frequency band (also note that in the context of the present application "femtocell" refers to the base station unit rather than the cell). As the two cells 4a, 4b are provided by the same base station unit then they share the same cell centre point, i.e. represent the same geographical node of the network, and they also share at least some of the same hardware resources. For example a dual-mode base station 4 may share the same processor for both cells 4a, 4b, though might not share the same antenna. The dual cells 4a, 4b may also share other base-station functionality, such as configuration management, synchronization and backhaul connection (i.e. same connection to the next element up in the cellular hierarchy). The geographical area of cells 4a, 4b form the network coverage "zone" of femtocell 4.

The invention could apply equally to any multi-mode base station (having at to least two cells), but by way of illustration the following embodiments are described in relation to a dual-mode femtocell 4.

The UEs 2A1, 2A2, 2B1 and 2B2 are arranged to be able to request admission to a particular cell, and when they do so, e.g. requesting admission to cell 4a, to request a particular quality of service. For example they could request to be provided with at least a certain uplink or downlink throughput, or to be provided with no more than a certain uplink or downlink latency.

Each of the base stations (4 and 6) comprises a radio resource management (RRM) entity (or "radio resource manager") arranged to receive admission requests from the UEs, if the UEs decide to select it, and decide whether to admit the UEs to the requested cell. The RRM entity of the dual mode femtocell 4 is a joint RRM entity for the two cells 4a and 4b. In this way the RRM entity for the dual mode femtocell 4 can manage the resources of the two cells 4a and 4b based on information relating to both of the cells (rather than based on information relating to just one of the cells).

The inventors have realized that in a multi-mode base station, such as a dual mode femtocell, if the different cells of the multi-mode base station operate using independent RRM entities, this can lead to inefficient use of base-station resources. In particular, if the access modes of the cells are configured inefficiently then a scenario may occur in which one of the cells is heavily loaded while another of the cells is lightly loaded. An imbalance such as this in the loading of the cells of a multi-mode base station may result in a poor Quality of Service (QOS) being provided to at least some of the UEs in the cells.

The inventors have further realized that it may be advantageous to control the access modes of the cells of a multi-mode base station based on the operating conditions of the cells since this may lead to an improved QOS for communication between the UEs and the multi-mode base station. This can be achieved using a joint RRM in a multi-mode base station which manages the resources for the plurality of cells of the multi-mode base station. In this way, a joint RRM can, advantageously, take account of operating conditions of all of the cells of the multi-mode base station to when controlling the access mode of one of the cells.

At a higher level of the cellular hierarchy the network may comprise one or more higher-level controller stations, which may be arranged to perform various further management functions. However, the present invention is concerned with radio resource management at the level of a multi-mode base station.

The users associated with the UEs may be members of closed subscriber groups (CSGs). More specifically, it is the IMSI (SIM card identifier) that is the member of the CSG. The IMSI identifies the user associated with the UE. The user may move the SIM card to a different UE device and still be a member of the CSG. In the example scenario shown in FIG. 1, the users of UEs 2A1 and 2A2 are members of a first CSG, called CSGA, while the users of UEs 2B1 and 2B2 are members of a second CSG, called CSGB.

Figure 2:
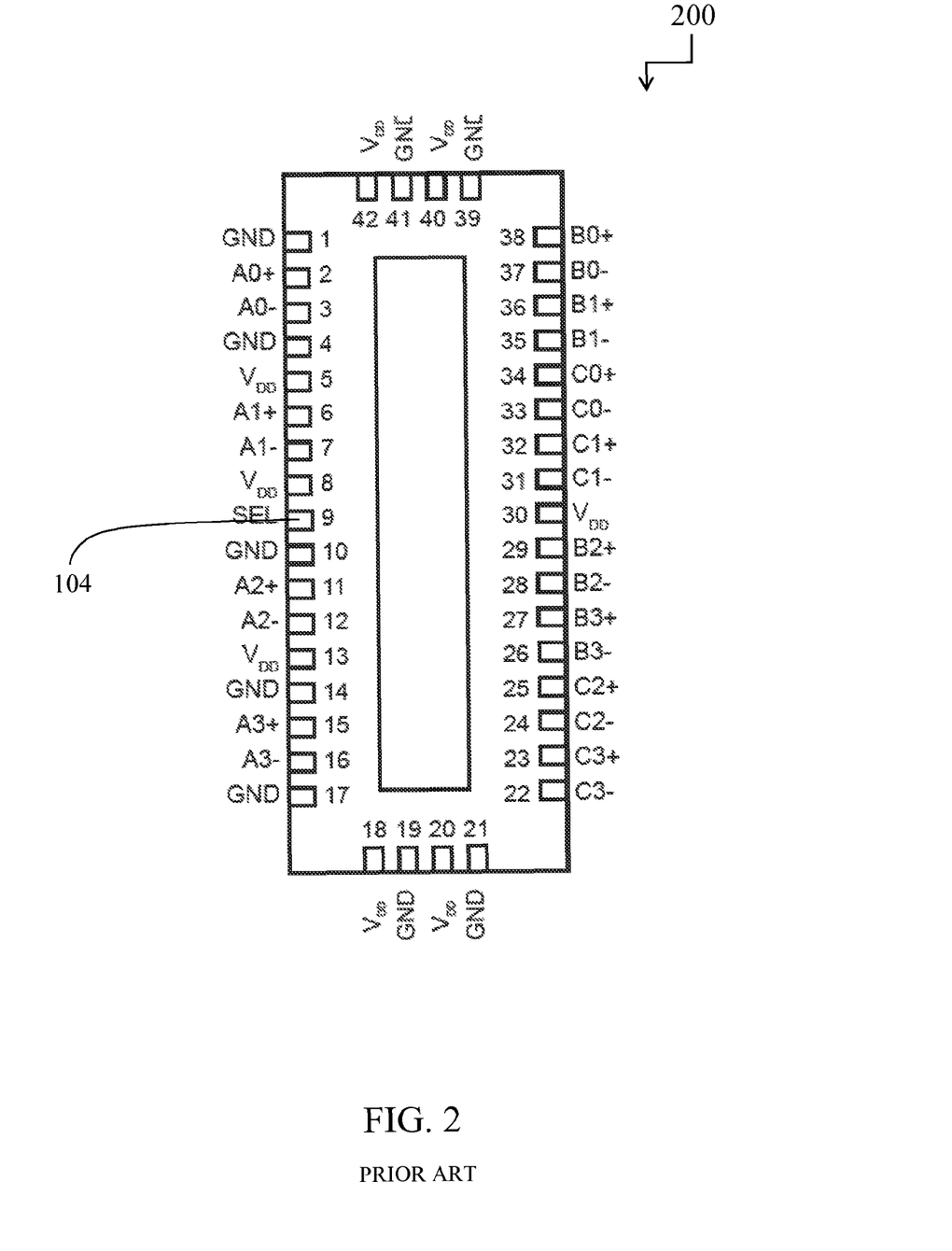
FIG. 2 is a flow chart for a method of controlling access to a base station.

With reference to the flow chart shown in FIG. 2 there is now described a method of controlling access to the dual-mode femtocell 4 according to a preferred embodiment.

In step S202 the operating conditions of the cells 4a and 4b are determined This may occur before or after the UEs are admitted to the cells.

In step S204 the access modes of the cells 4a and 4b are controlled based on the determined operating conditions. The joint RRM entity in the dual-mode femtocell 4 performs steps S202 and S204. For example, the access mode of the cells 4a and 4b may be dynamically adjusted based on the current operating conditions of the cells 4a and 4b. This allows the access modes of the cells 4a and 4b to be adapted to suit the current operating conditions in the zone (i.e. the network coverage area) of the dual-mode femtocell 4. By controlling the access modes of the cells 4a and 4b to suit the operating conditions experienced by the femtocell 4 the performance of the femtocell 4 can be improved. The improvements could be related to the throughput and QOS achieved by one of the UEs, by all of the UEs served by the femtocell 4 and/or UEs served by the neighboring base station 6.

There are described below some example scenarios in which the method described above can improve the performance within the system shown in FIG. 1.

In a first example scenario, the joint RRM entity of the dual-mode femtocell 4 could take a simple approach of dynamically adjusting the closed access mode of each cell (4a and 4b) to provide different levels of service for different user groups. For example, the femtocell 4 may be installed by a company to provide an improved service for its employees and the company may want to ensure that a select group of employees receive the best possible level of service. This could be achieved in two similar, but slightly different implementations, as described below.

In a first implementation, all of the employees are added into the user group CSGA, while only the select group of employees are also added into the user group CSGB. In the dual-mode femtocell 4, the cell 4a is configured to operate in a closed access mode for CSGA (such that all of the employees can access cell 4a), while the cell 4b is configured to operate in a closed access mode for CSGB (such that only the select group of employees can access cell 4b). In the example shown in FIG. 1 the UEs 2A1 and 2A2 are associated with users in the CSGA and can therefore access cell 4a but not cell 4b, whereas the UEs 2B1 and 2B2 are associated with users in the CSGB (and who are also in CSGA) and can therefore access both cells 4a and 4b. It should be noted that because both cells 4a and 4b are configured to operate in closed access modes, users who are not in either CSGA or CSGB (i.e. users who are not employees of the company) cannot access either cell 4a or cell 4b. The joint Radio Resource Manager of the dual-mode femtocell 4 can move the select group of employees (i.e. those users in both CSGA and CSGB) between the cells to ensure that they receive the best possible service level. This can be achieved by performing handover procedures as is known in the art to move the UEs from one cell of the dual-mode femtocell 4 to the other cell of the dual-mode femtocell 4. In addition, if there is little activity from the select group of users in cell 4b then the joint RRM of the dual-mode femtocell 4 can adjust the access mode of cell 4b to thereby make cell 4b available to UEs of users from CSGA, thereby providing a better performance for these UEs. This can be achieved by making the cell 4b operate in a closed access mode for CSGA. If the activity of the users in CSGB subsequently increases then the RRM can adjust the access mode of cell 4b to thereby make cell 4b available only to to UEs of the select users (i.e. those in CSGB). This can ensure that the select users are provided with a good performance by the dual-mode femtocell 4. This can be achieved by making the cell 4b operate in a closed access mode for CSGB. It is therefore apparent that controlling the access mode of the cell 4b based on the operating conditions of the coverage area (or "zone") of the dual-mode femtocell 4 can improve the performance for the UEs served by the dual-mode femtocell 4.

In a second implementation, the select group of employees are added to the user group CSGB and all other employees (but not the select group of employees) are added to CSGA. In the dual-mode femtocell, cell 4b is configured to operate in a closed access mode for CSGB (such that only the select group of employees can access cell 4b), while cell 4a is configured to operate in a closed access mode allowing access for UEs of users of both CSGA and CSGB (such that all of the employees can access cell 4a). In the example shown in FIG. 1 the UEs 2A1 and 2A2 are associated with users in the CSGA and can therefore access cell 4a but not cell 4b, whereas the UEs 2B1 and 2B2 are associated with users in the CSGB and can therefore access both cells 4a and 4b. In a similar way to the first implementation the joint RRM of the dual-mode femtocell 4 can control the access modes of the cells 4a and 4b to thereby alter which CSG groups can access which of the cells. In this way, it can be ensured that the members of CSGB receive the best service level, and/or that more access is allowed for CSGA members when there is little activity from CSGB members.

The method may be expanded to a closed/hybrid access scenario, where CSG members are the select group of employees and non-CSG members are all other users. The joint RRM of the dual-mode femtocell 4 can dynamically adjust whether the cells 4a and 4b operate in closed access modes or hybrid access modes based on the activity of the CSG members. For example, if the activity of the select group of employees is low (e.g. below a threshold activity level) then the access modes of the cells 4a and 4b may be controlled to both be the hybrid access mode. In this way UEs associated with users who are not in the select group of users can access both cells 4a and 4b, while the UEs of the select group of users are provided a preferential service to from the cells 4a and 4b when they do communicate with the cells. However, if the activity of the select group of employees is high (e.g. above the threshold activity level) then the access mode of cell 4b may be controlled to be a closed access mode allowing only UEs of the select group of users to access the cell 4b, whereas the access mode of the cell 4a may be controlled to be the hybrid access mode. In this way only UEs associated with the select group of users (e.g. UEs 2B1 and 2B2 in FIG. 1) can access the cell 4b, so the performance provided to the select group of users is good. However, UEs of users who are not in the select group of users (e.g. UEs 2A1 and 2A2) can access cell 4a, but the UEs of the select group of users are provided a preferential service from the cell 4a when they communicate with cell 4a (due to the hybrid access mode).

In a second example scenario, the joint RRM of the dual-mode femtocell 4 could take a more complex approach to adjusting the access modes of the cells 4a and 4b using the interference and loading levels of the cells 4a and 4b, and of the cell 6a of the neighboring base station 6. The interference and loading levels of other neighboring cells (not shown in FIG. 1) may also be used to adjust the access modes of the cells 4a and 4b. The dual-mode femtocell 4 may have cell 4a operating in a frequency sub-band A and cell 4b operating in a frequency sub-band B. In many situations there will also be neighbor cells (e.g. cell 6a) also operating on sub-band A and/or sub-band B. As an example, the access modes of the cells 4a and/or 4b could be changed to the open access mode or the hybrid access mode if the monitored loading in the cell 6a of the neighboring base station 6 is above a threshold load. This helps with the excessive loading in the cell 6a of the neighboring base station 6 by allowing more UEs to connect to the cells 4a and/4b of the dual-mode femtocell 4.

The joint RRM entity in the dual-mode femtocell 4 can use sniffing functionality to determine the received signal powers P_A and P_B from neighboring cells in the respective frequency sub-bands A and B. The joint RRM entity will then make a decision on whether cells 4a and 4b should operate in the open access mode, a hybrid access mode or a closed access mode as described below.

In a first step, it is determined whether at least one of the neighboring cells has to a poor power level. In other words, it is determined whether the signal strength of signals being transmitted within a neighboring cell is below a threshold. For example, there may be a neighboring cell A operating in frequency sub-band A which currently has a power level of P_A and there may be a neighboring cell B operating in frequency sub-band B which currently has a power level of P_B. The power level P_A is compared to a threshold power level "threshA", and the power level P_B is compared to a threshold power level "threshB". In this way it can be determined whether P_A<threshA or P_B<threshB, to thereby determine whether at least one of the neighboring cells has a poor power level. The thresholds (threshA and threshB) may or may not be equal to each other. For example, if the neighboring cells implement different RATs then the thresholds threshA and threshB indicating what constitutes a poor power level may be different for the different neighboring cells.

If it is determined that at least one of the neighboring cells has a poor power level then the joint RRM entity of the dual-mode femtocell 4 can determine that there is a coverage gap (hole) in the network which it could help fill by setting at least one of its cells (in the relevant frequency band) to a hybrid or open access mode. The joint RRM entity will preferably control the access mode of the cell which is in the same sub-band as the neighboring cell with the "worst" power level to be either a hybrid or open access mode. This may increase the number of UEs which can access the cell (as compared to operating the cell in the closed access mode), thereby providing access to more UEs in a frequency sub-band for which the power level in neighboring cells is low. This can be advantageous in terms of lowering the interference experienced by the UEs in the cell. As an example, the neighboring cell with the "worst" power level can be found by determining the maximum of (threshA−P_A) and (threshB−P_B), in other words by determining the cell with a power level which is furthest below its respective threshold level. For example, if it is found that the neighboring cell A operating in frequency sub-band A has the worst power level then the access mode of the cell 4a (which is also operating in frequency sub-band A) is set to a hybrid or open access mode, thereby allowing a greater number of UEs to access the cell 4a (as compared to operating the cell 4a in a closed access to mode). Selecting the cell 4a for making the access mode hybrid or open on the basis of the neighboring cell A having the worst power level will help ensure that inter-frequency measurements/handover are not likely to be required by "visiting UEs" from neighboring cells, thereby reducing the signalling interaction between the femtocell 4 and the cells of the neighboring base stations (e.g. cell 6a). Furthermore, this ensures that the cell 4a which is in the hybrid or open access mode is least impacted by interference from the downlink of the neighboring cells (since those neighboring cells in frequency sub-band A have a low power level). This means that the dual-mode femtocell 4 is more likely to have capacity available for visiting UEs.

However, if the neighboring cells do not have a poor power level (i.e. the power levels are above the threshold power levels, that is P_A>threshA and P_B>thresh) then the RRM entity of the dual-mode femtocell 4 may choose not the make the access mode of any of its cells hybrid or open. This ensures that a good level of performance can be provided to the users in the closed subscriber groups associated with the closed access modes of the cells of the dual-mode femtocell 4.

The access modes of the cells 4a and 4b may be initially assigned by the joint RRM entity of the dual-mode femtocell 4, as described above. However, the initial assignment may be subsequently modified based on loading, or other operating conditions of the cells 4a and 4b which may change. The operating conditions of the cells 4a and 4b are affected by the conditions on neighboring cells as described above. For example the operating conditions of the cells 4a and 4b are affected by the power level in neighboring cells operating in the same frequency sub-bands as the cells 4a and 4b. For example, during the operation of the dual-mode femtocell 4 the RRM entity of the dual-mode femtocell 4 may detect that the available bandwidth in cell 4b has reached a low-resource available threshold. The cell 4b may implement a Radio Access Technology RATB whereas the cell 4a may implement a Radio Access Technology RATA. It may be that RATB has a higher data throughput than RATA. In this case, the RRM entity performs an inter-RAT handover to move non-CSG UEs (e.g. UEs 2A1 and 2A2) to cell 4a. If cell 4b is still highly occupied, the RRM entity may dynamically adjust the access mode of the cell 4b to be a closed access mode in to which only UEs of members of the CSGB can access the cell 4b. In this way the bandwidth available for users in CSGB (e.g. users of UEs 2B1 and 2B2) can be preserved. At some later point in time, when the loading in the dual-mode femtocell 4 reduces, the access mode of the cell 4b could be returned to either an open or hybrid access mode, thereby allowing other UEs (e.g. UEs 2A1 and 2A2) to access the cell 4b as well as the cell 4a.

The blocks and method steps described herein, e.g. as shown in FIG. 2, may be implemented in hardware or in software. Furthermore, there may be provided a computer program product comprising instructions which when executed by computer processing means at the dual-mode femtocell 4 will implement the methods described above. In particular, the RRM entity could implement each step in FIG. 2 at the dual-mode femtocell 4.

While this invention has been particularly shown and described with reference to preferred embodiments, it will be understood to those skilled in the art that various changes in form and detail may be made without departing from the scope of the invention as defined by the appendant claims.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A method of controlling access to a base station, the base station being arranged to serve a zone, the zone comprising a first cell implementing an access mode as one of: an open access mode, a hybrid access mode, and a closed access mode, the method comprising:
   determining operating conditions of the zone served by the base station, the base station being a multi-mode base station, and the zone also including a second cell implementing an access mode as one of an open access mode, a hybrid access mode, and a closed access mode; and
   controlling the access mode of the first cell based on the determined operating conditions of the zone served by the base station to establish the access mode as one of an open access mode, a hybrid access mode, and a closed access mode, such that the access mode of the first cell is controlled based on the access mode of the second cell.

2. The method of claim 1 further comprising controlling the access mode of the second cell based on the determined operating conditions of the zone served by the base station.

3. The method of claim 1 wherein the first cell and second cell operate using different radio access technologies or operate in different frequency sub bands.

4. The method of claim 1 wherein the controlling the access mode of the first cell comprises dynamically adjusting the access mode of the first cell.

5. The method of claim 1 wherein the determining operating conditions of the zone comprises monitoring activity in the zone.

6. The method of claim 5 wherein the controlling the access mode of the first cell comprises changing the access mode of the first cell from the closed access mode to the hybrid access mode or the open access mode if the monitored activity in the zone indicates that a level of activity of a user group associated with the closed access mode of the first cell is below a threshold activity level.

7. The method of claim 5 wherein the controlling the access mode of the first cell comprises changing the access mode of the first cell to the closed access mode from the hybrid access mode or the open access mode if the monitored activity in the zone indicates that a level of activity of a user group associated with the closed access mode of the first cell is above a threshold activity level.

8. The method of claim 1 wherein the first cell implements the closed access mode and the step of controlling the access mode of the first cell comprises dynamically adjusting the closed access mode to thereby dynamically adjust a set of users which are associated with the closed access mode and are thereby allowed to access the first cell.

9. The method of claim 1 wherein the determining operating conditions of the zone comprises monitoring loading in the zone.

10. The method of claim 1 wherein the determining operating conditions of the zone comprises monitoring loading in a cell of a neighboring base station, the cell of the neighboring base station operating in a same frequency band as at least part of the zone served by the base station.

11. The method of claim 10 wherein the controlling the access mode of the first cell comprises changing the access mode of the first cell to the open access mode or the hybrid access mode if the monitored loading in the cell of the neighboring base station is above a threshold load.

12. A base station arranged to serve a zone, the zone comprising a first cell implementing an access mode as one of an open access mode, a hybrid access mode, and a closed access mode, and the base station comprising a radio resource manager for controlling access to the base station, the radio resource manager configured to:
   determine operating conditions of the zone served by the base station, the base station being a multi-mode base station, and the zone also including a second cell implementing an access mode as one of an open access mode, a hybrid access mode, and a closed access mode; and
   control the access mode of the first cell based on the radio resource manager's determined operating conditions of the zone served by the base station to establish the access mode as one of an open access mode, a hybrid access mode, and a closed access mode, such that the access mode of the first cell is controlled based on the access mode of the second cell.

13. The base station of claim 12 wherein the base station is a dual-mode femtocell.

14. A computer program product, encoded in a non-transitory format on a computer readable medium, for controlling access to a base station, the base station being arranged to serve a zone, the zone comprising a first cell implementing an access mode as one of an open access mode, a hybrid access mode, and a closed access mode, and the computer program product being embodied on a non-transient computer-readable medium and configured so as when executed on a processor of the base station to perform the operations of:
   determining operating conditions of the zone served by the base station the base station being a multi-mode base station, and the zone also including a second cell implementing an access mode as one of an open access mode, a hybrid access mode, and a closed access mode; and
   controlling the access mode of the first cell based on the determined operating conditions of the zone served by the base station to establish the access mode as one of an open access mode, a hybrid access mode, and a closed access mode, such that the access mode of the first cell is controlled based on the access mode of the second cell.

15. A method of controlling access to a base station, the base station being arranged to serve a zone, the zone comprising a first cell implementing an access mode as one of: an open access mode, a hybrid access mode, and a closed access mode, the method comprising:
   determining operating conditions of the zone served by the base station;
   controlling the access mode of the first cell based on the determined operating conditions of the zone served by the base station to establish the access mode as one of an open access mode, a hybrid access mode, and a closed access mode; and
   monitoring a power level in a cell of a neighboring base station, the cell of the neighboring base station operating in a same frequency band as the first cell such that if the monitored power level is below a threshold power level then the controlling the access mode of the first cell comprises setting the access mode of the first cell to the open access mode or the hybrid access mode.

16. The method of claim 15 wherein the base station is a multi-mode base station, and the zone further comprising a second cell implementing an access mode as one of an open access mode, a hybrid access mode, and a closed access mode.

17. The method of claim 16 further comprising controlling the access mode of the second cell based on the determined operating conditions of the zone served by the base station.

18. The method of claim 16 wherein the first cell and second cell operate using different radio access technologies or operate in different frequency sub bands.

19. The method of claim 16 wherein the access mode of the first cell is controlled based on the access mode of the second cell.

20. The method of claim 15 wherein the controlling the access mode of the first cell comprises dynamically adjusting the access mode of the first cell.

21. The method of claim 15 wherein the determining operating conditions of the zone comprises monitoring activity in the zone.

22. The method of claim 21 wherein the controlling the access mode of the first cell comprises changing the access mode of the first cell from the closed access mode to the hybrid access mode or the open access mode if the monitored activity in the zone indicates that a level of activity of a user group associated with the closed access mode of the first cell is below a threshold activity level.

23. The method of claim 21 wherein the controlling the access mode of the first cell comprises changing the access mode of the first cell to the closed access mode from the hybrid access mode or the open access mode if the monitored activity in the zone indicates that a level of activity of a user group associated with the closed access mode of the first cell is above a threshold activity level.

24. The method of claim 15 wherein the first cell implements the closed access mode and the step of controlling the access mode of the first cell comprises dynamically adjusting the closed access mode to thereby dynamically adjust a set of users which are associated with the closed access mode and are thereby allowed to access the first cell.

25. The method of claim 15 wherein the determining operating conditions of the zone comprises monitoring loading in the zone.

26. The method of claim 15 wherein the determining operating conditions of the zone comprises monitoring loading in a cell of a neighboring base station, the cell of the neighboring base station operating in a same frequency band as at least part of the zone served by the base station.

27. The method of claim 26 wherein the controlling the access mode of the first cell comprises changing the access mode of the first cell to the open access mode or the hybrid access mode if the monitored loading in the cell of the neighboring base station is above a threshold load.

28. The method of claim 15 wherein if the monitored power level is above the threshold power level then the controlling the access mode of the first cell comprises setting the access mode of the first cell to the closed access mode.

* * * * *

UNITED STATES PATENT AND TRADEMARK OFFICE
CERTIFICATE OF CORRECTION

PATENT NO.        : 8,712,469 B2
APPLICATION NO.   : 13/472267
DATED             : April 29, 2014
INVENTOR(S)       : Nicholas William Whinnett et al.

It is certified that error appears in the above-identified patent and that said Letters Patent is hereby corrected as shown below:

In the Drawings

Please delete "FIG. 1 PRIOR ART" and insert Replacement Sheet Fig. 1 as attached, therefor.

Please delete "FIG. 2 PRIOR ART" and insert Replacement Sheet Fig. 2 as attached, therefor.

Signed and Sealed this
Twenty-sixth Day of August, 2014

Michelle K. Lee
*Deputy Director of the United States Patent and Trademark Office*

Fig 1

Fig 2